Oct. 19, 1971  H. L. COTTRELL  3,613,366
HYDRAULIC TRANSMISSION
Filed July 7, 1969  2 Sheets-Sheet 1
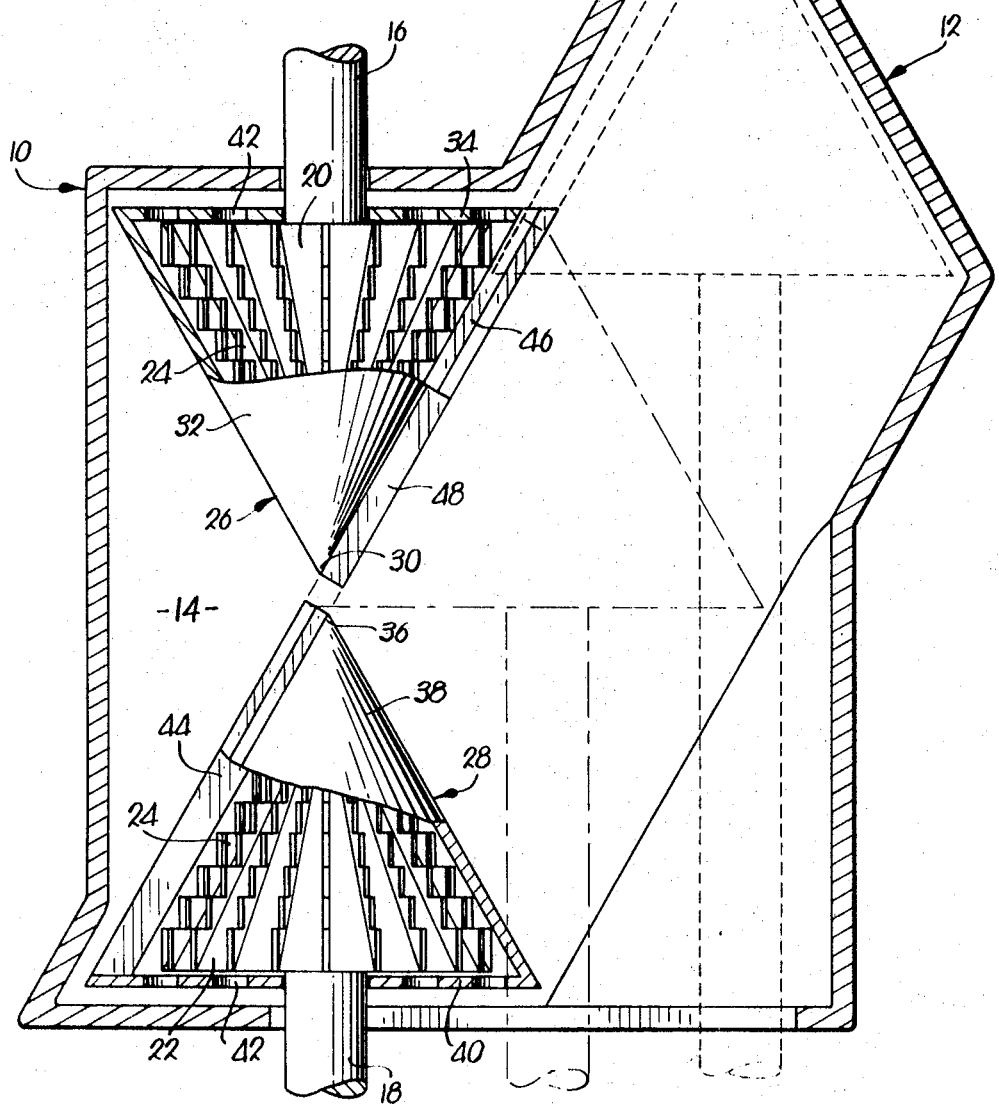
Fig.1.
Fig.2.
Fig.3.
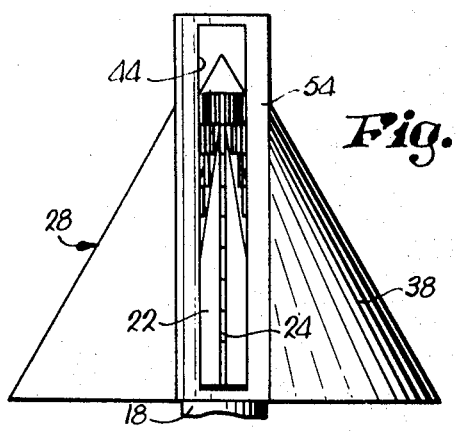
INVENTOR
Harold L. Cottrell
BY Schmidt, Johnson, Hovey,
Williams & Chase.
ATTORNEYS.

Oct. 19, 1971     H. L. COTTRELL     3,613,366

HYDRAULIC TRANSMISSION

Filed July 7, 1969     2 Sheets-Sheet 2

INVENTOR
Harold L. Cottrell

BY Schmidt, Johnson, Hovey,
Williams & Chase.
ATTORNEYS.

United States Patent Office 3,613,366
Patented Oct. 19, 1971

3,613,366
HYDRAULIC TRANSMISSION
Harold L. Cottrell, Grandview, Mo., assignor to Power Control, Inc., Kansas City, Mo.
Continuation-in-part of application Ser. No. 628,228, Mar. 29, 1967, now Patent No. 3,455,110, dated July 15, 1969. This application July 7, 1969, Ser. No. 839,158
Int. Cl. F16d 33/04; F16h 41/00
U.S. Cl. 60—54
5 Claims

ABSTRACT OF THE DISCLOSURE

A hydraulic transmission unit including, within a sealed, fluid filled container, a pair of shafts rotatably mounted in the container and extending therefrom, a conical impeller on one of the shafts and a conical turbine on the other shaft, the shafts being relatively shiftable from an initial position in axial alignment to a position wherein the impeller and the turbine are in closer proximity than in the initial position. In one form of the invention the impeller and turbine are each provided with a perforate casing whereby to direct the fluid flow therebetween in the most efficient manner; and in the other form, the impeller is in the nature of a conical male impeller, the turbine being in the form of a conical female unit.

---

This application is a continuation-in-part of application Ser. No. 628,228, filed Mar. 29, 1967, and entitled "Variable Hydraulic Transmission and Control," now Pat. No. 3,455,110, issued July 15, 1969.

The present invention relates to the hydraulic transmission of power from a power source, such as a driving impeller, powered by an engine or the like, to a power output shaft, the output shaft having a turbine coupled therewith and disposed within the same fluid filled container as the impeller.

It is the most important object of this invention to provide, within a fluid filled container, a conical impeller and a conical turbine, each being rotatably carried by a shaft extending from the container, the shafts being relatively shiftable whereby to move the impeller and the turbine from an initial position wherein the shafts are in axial alignment to various other positions wherein the impeller and the turbine are in closer proximity than in the initial position.

Another important object of one embodiment of the disclosed invention is to provide, for the impeller and the turbine, a separate casing for each of said units, the casings conforming in configuration to that of the impeller and the turbine, each casing having a fluid passage therein, the passages of the two casings being in communication when the turbine is shifted relative to the impeller whereby to precisely direct, for most efficient operation, the fluid flow between the impeller and the turbine, thereby preventing dispersal of the fluid forces throughout the container. In said embodiment the casings are each also provided with a plurality of fluid openings in the base wall thereof, such openings permitting the flow of fluid into and out of the casings and thereby insuring that the casings are, at all times, completely filled with the fluid whereby the transmission of forces between the impeller and the turbine may be of greatest efficiency.

In another embodiment of the invention there is also provided a fluid filled container having a pair of shafts rotatably mounted therein and extending therefrom, one of the shafts carrying a conical impeller in the nature of a male unit; the other shaft carrying a conical turbine in the nature of a female unit, the male impeller being provided with vanes exteriorly thereof, the female turbine being provided with vanes interiorly thereof and defining a cavity for receiving driving forces from the fluid as it is agitated by the male impeller, which impeller may be shifted toward and away from the conical female turbine.

Both forms of the disclosed invention utilize conical drive units provided with vanes and, in each instance, one of the units is shiftable with respect to the other whereby to vary the forces developed between the two units and within the fluid filled container. This construction allows smooth transmission of power from the impeller to the turbine, the various degrees of power being virtually unlimited and depending upon the proximity of the impeller and the turbine.

Thus an important object of the invention is to provide, in a hydraulic transmission, mechanism which affords an easy translation from low speed and power to optimum power and high speed with little if any waste of time and motion or sudden uncontrolled surges of power.

Other objects of the invention will become apparent from the following specification and accompanying drawings, wherein:

FIG. 1 is a top plan view of one embodiment of the hydraulic transmission, parts being broken away and in section to reveal details of construction;

FIG. 2 is a side elevational view of the turbine and its casing of the hydraulic transmission;

FIG. 3 is a fragmentary sectional view of the coupling means for the casings;

Figure 5:
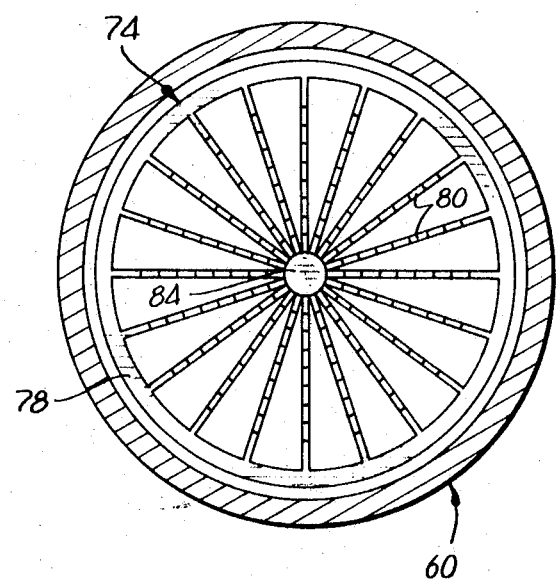
FIG. 5 is a view taken along line 5—5 of FIG. 4.

In the embodiment of the invention illustrated in FIGS. 1–3, the hydraulic transmission 10 includes, as its major components, a sealed container 12 completely filled with a fluid 14, the container having one shaft 16 rotatably mounted therein and extending therefrom; and another shaft 18 also rotatably mounted within the container 12 and extending therefrom. Shaft 16 carries a conical impeller 20 thereon, which impeller is rotatable with shaft 16, shaft 16 being driven by some suitable exterior source of power (not shown). The other shaft 18 carries a conical turbine 22 which is rotatable with said shaft 18 and is driven by virtue of the transmission of forces through the fluid 14, such transmission being generated by the rotation of impeller 20.

Both impeller 20 and turbine 22 are provided with a plurality of vanes such as 24, vanes 24 sometimes being referred to as spades or burrs, the vanes being mounted integrally upon the impeller 20 and turbine 22 and being in the nature of serrated strips extending from the apex to the base of the conical impeller 20 and the conical turbine 22. It will be appreciated that vanes 24 may be designed in many different configurations in order to accomplish the desired purpose and to obtain the desired efficiency, depending upon the particular environment in which the transmission 10 is to be utilized. The vanes 24 upon the impeller 20 act as power thrusters and the vanes 24 on turbine 22 receive the power transmitted through fluid 14 by the rotation of impeller 20.

In the embodiment of FIGS. 1–3 there is a casing 26 substantially enclosing the impeller 20 and a generally similar casing 28 enclosing the turbine 22. Each of the casings 26 and 28 is conical in configuration whereby to provide, in the instance of casing 26, an apex 30, a conical sidewall 32, and a base ball 34. Likewise, casing 28 has an apex 36; a sidewall 38; and a base wall 40. In each instance, the base walls 34 and 40 respectively are provided with a plurality of fluid openings 42 of suitable configuration whereby to permit the flow of fluid into and out of the corresponding casings 26 and 28 from the container 12. The provision of such openings 42 insures that the casings 26 and 28 are always completely filled with the fluid 14 so that maximum efficiency may be obtained when the transmission unit 10 is placed into operation.

In order to most efficiently direct the flow of fluid 14 between the impeller 20 and the turbine 22, the casings 26 and 28 are provided with fluid passages 44 and 46 respectively, said passages being in communication when the turbine 22 is shifted obliquely with respect to the impeller 20 in a manner hereinafter described. More specifically, the casing 26 for impeller 20 is provided, in the sidewall 32 thereof, with a pair of spaced, opposed, outwardly extending flanges 48, each of the flanges having an inturned portion 50, the edges of portions 50 being spaced apart whereby to define therebetween the fluid passage of casing 26. Likewise, flanges 48 in effect define a trackway which slidably receives a complementary coupling on the sidewall 38 of the casing 28, said coupling being defined by a pair of outward extensions 52 on the sidewall 38 of casing 28, each of said extensions 52 having an outturned lip 54, the extensions 52 and lips 54 defining, in effect, a trackway which mates with the trackway defined by the flanges 48 on sidewall 32, thereby securely placing in communication the fluid passage 44 of casing 28 with the fluid passage 46 of the casing 26.

As clearly illustrated in the drawing, the turbine 22 is intended to be shifted obliquely with respect to the impeller 20, the turbine 22 moving from the full-line position shown in FIG. 1 through the dashed and dotted-line positions thereof or any variable position between those illustrated depending upon the power transmission which is desired. In order to permit such shifting of the shaft 18, a suitable seal in the nature of a telescopic seal is provided therefor in the adjacent wall of the container 12 whereby leakage of fluid 14 from the container will be prevented as the shaft 18 is shifted along the one wall of container 12 to thereby move turbine 22 through the oblique path with respect to the impeller 20.

Once turbine 22 is moved from its initial position wherein the shaft 18 is in axial alignment with the shaft 16, the coupling mechanism on the two casings 26 and 28 will be brought into engagement whereby to insure that the fluid passages 44 and 46 are in communication, it being noted that said passages 44 and 46 are in the nature of elongated slots extending from the apex of their corresponding casings to the base wall thereof.

Thus, as the encased turbine is shifted obliquely with respect to the encased impeller and as the impeller is being driven by a suitable outside source, power is transmitted through the fluid 14 and, more specifically, through the passages 44 and 46 to thereby regulate the amount of power which is transmitted from the impeller 20 to the turbine 22. It will be further appreciated that the coupling means hereinabove described retain the casings in juxtaposed relationship when the turbine is shifted with respect to the impeller, this being accomplished by the interengagement of the trackways defined by the above-mentioned portions of the sidewalls 32 and 38 of the respective casings 26 and 28. Accordingly, the most efficient transfer of fluid power from the driving impeller to the driven turbine is obtained, it being appreciated that the width of the fluid passages may be varied depending upon the environment in which the transmission 10 is to be utilized.

Figure 4:
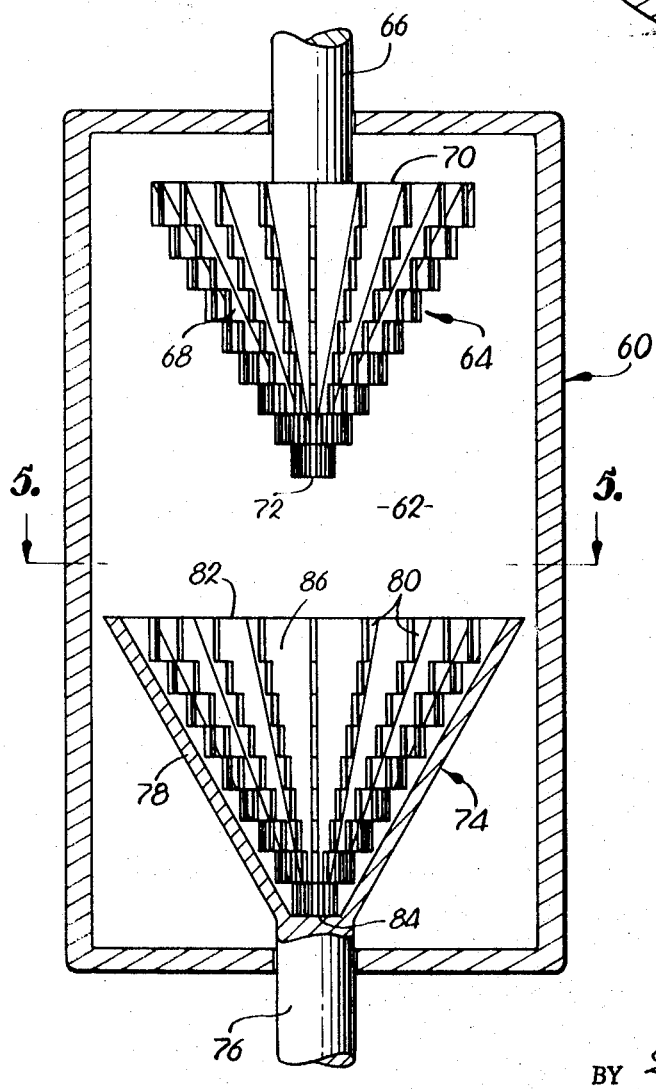
FIG. 4 is a top plan view of another embodiment of the hydraulic transmission, parts being broken away and in section to reveal details of construction.

In the embodiment of the invention illustrated in FIGS. 4 and 5, there is similarly provided a sealed container 60, the same being filled with a suitable fluid 62. A conical male impeller 64 is positioned within the container 60 and is rotatably driven by a shaft 66 which extends from the container 60 and is driven by a suitable source of external power (not shown). The conical impeller 64 is provided with a plurality of vanes 68 on the exterior thereof, said vanes being in the nature of serrated strips which extend from the base 70 to the apex 72 of the conical impeller 64.

A conical female turbine 74 is also positioned within the container 60, said turbine 74 being carried by another shaft 76 which is rotatably mounted within the container 60 and extends therefrom.

The female conical turbine 74 is provided with an exterior wall 78, the outer surface of which is smooth, the inner surface thereof being provided with a plurality of vanes 80 in the nature of serrated strips which extend from the base end 82 of the turbine 74 to the apex 84 thereof, said vanes serving to define a central cavity 86 which is of a configuration complementary to the exterior of conical impeller 64. Thus, the impeller 64 is in the nature of a male unit and the turbine 74 is in the nature of a female unit, both of said units being of conical configuration in the embodiment chosen for illustration.

The shafts 66 and 76 are in initial axial alignment and are retained in said alignment as the impeller 64 is shifted toward the turbine 74, such shifting movement of the impeller 64 varying the forces which are transmitted from the driving unit through the fluid 62. The shifting movement of shaft 66 and thereby impeller 64 can be achieved by any suitable control means, such accomplishing a change in the spacing of the impeller 64 with respect to the turbine 74, the variance in distance altering the fluid thrust which is delivered to the turbine 74 and thus varying the transmission of power therebetween and in the hydraulic transmission unit.

Thus, in both embodiments of the invention the conical configuration of the impeller and the turbine is utilized to maximize the efficiency of the hydraulic transmission unit, the power flow therethrough being varied by the relative position of the impeller and turbine units whereby to achieve the maximum result.

Having thus described the invention, what is claimed as new and desired to be secured by Letters Patent is:

1. In a hydraulic transmission:
   a container adapted to be filled with fluid;
   a pair of shafts rotatably mounted in said container and extending therefrom;
   an impeller mounted in said container on one of said shafts;
   a turbine mounted in said container on the other shaft, said other shaft being shiftable obliquely with respect to said one shaft;
   a perforate casing for said impeller; and
   a perforate casing for said turbine.

2. A hydraulic transmission as set forth in claim 1, said casings each having an elongated fluid passage formed therein, said passages being in communication when said other shaft is shifted.

3. A hydraulic transmission as set forth in claim 2, there being coupling means on each casing, said means being engageable whereby to maintain said passages in communication when said other shaft is shifted.

4. A hydraulic transmission as set forth in claim 3, each of said casings having a plurality of fluid openings formed therein.

5. A hydraulic transmission as set forth in claim 4, the impeller and the turbine being conical, said casings each being conical in configuration, the fluid passage being formed in the sidewall of each casing, the fluid openings being formed in the base walls thereof.

References Cited

UNITED STATES PATENTS

| | | | |
|---|---|---|---|
| 2,544,713 | 3/1951 | Miller | 60—54 |
| 2,336,167 | 12/1943 | Dillon | 60—54 |
| 2,359,930 | 10/1944 | Miller | 60—54 |
| 2,395,047 | 2/1946 | Hanson | 60—54 |
| 3,091,430 | 5/1963 | Thomas | 60—54 X |
| 3,209,874 | 10/1965 | Foster et al. | 60—54 |
| 2,627,954 | 2/1953 | Lewis | 60—54 X |

EDGAR W. GEOGHEGAN, Primary Examiner